United States Patent
Tanaka et al.

(10) Patent No.: US 10,376,981 B2
(45) Date of Patent: Aug. 13, 2019

(54) ARC WELDING POWER SUPPLY AND METHODS FOR CONTROLLING ARC WELDING POWER SUPPLY

(71) Applicant: Daihen Corporation, Osaka-shi, Osaka (JP)

(72) Inventors: Toshiyuki Tanaka, Osaka (JP); Toshiaki Nakamata, Osaka (JP)

(73) Assignee: Daihen Corporation, Osaka (JP)

( * ) Notice: Subject to any disclaimer, the term of this patent is extended or adjusted under 35 U.S.C. 154(b) by 1307 days.

(21) Appl. No.: 14/330,502

(22) Filed: Jul. 14, 2014

(65) Prior Publication Data
US 2015/0021307 A1    Jan. 22, 2015

(30) Foreign Application Priority Data
Jul. 17, 2013 (JP) .................. 2013-148645

(51) Int. Cl.
| | | |
|---|---|---|
| *B23K 9/10* | (2006.01) | |
| *B23K 9/12* | (2006.01) | |
| *B23K 9/133* | (2006.01) | |
| *B23K 9/28* | (2006.01) | |

(52) U.S. Cl.
CPC ............ *B23K 9/125* (2013.01); *B23K 9/1006* (2013.01); *B23K 9/1043* (2013.01); *B23K 9/133* (2013.01)

(58) Field of Classification Search
CPC .... B23K 9/1006; B23K 9/1043; B23K 9/125; B23K 9/133; B23K 9/0735; B23K 9/1037; B23K 9/1012; B23K 9/124; B23K 9/173; B23K 9/1093; B23K 9/10; B23K 9/12; B23K 9/28

USPC ... 219/137.2, 137.31, 130.1, 130.21, 130.31, 219/130.4, 137.7, 137.71, 137 PS
See application file for complete search history.

(56) References Cited

U.S. PATENT DOCUMENTS

2012/0255940 A1    10/2012    Fujiwara et al.

FOREIGN PATENT DOCUMENTS

| | | |
|---|---|---|
| JP | 4807474 B2 | 8/2011 |
| JP | 2012006020 A | 1/2012 |
| JP | 2012166247 A | 9/2012 |

OTHER PUBLICATIONS

Japanese to English machine translation of JP 2012-166247.*
European Search Report dated Sep. 7, 2015, corresponding to European Patent Application No. 14176931.

* cited by examiner

*Primary Examiner* — Michael G Hoang
(74) *Attorney, Agent, or Firm* — Kilpatrick Townsend & Stockton LLP

(57) ABSTRACT

An arc welding power supply supplies power to a welding wire functioning as a discharge electrode to generate an arc from an electrode distal end of the welding wire and perform arc welding on a welded article. The arc welding power supply includes an output control unit that adjusts the power supplied to the welding wire to a power value suitable for arc welding. A feed control unit cyclically changes a feeding speed of the welding wire. The feeding speed includes a forward feeding speed and a rearward feeding speed. An amplitude control unit cyclically changes an amplitude of the feeding speed of the welding wire to cyclically vary an average arc length.

3 Claims, 3 Drawing Sheets

ARC WELDING POWER SUPPLY AND METHODS FOR CONTROLLING ARC WELDING POWER SUPPLY

CROSS-REFERENCE TO RELATED APPLICATIONS

This application is based upon and claims the benefit of priority from prior Japanese Patent Application No. 2013-148645, filed on Jul. 17, 2013, the entire contents of which are incorporated herein by reference.

BACKGROUND OF THE INVENTION

The present invention relates to a consumable electrode type arc welding power supply and a method for controlling such a welding power supply.

When performing arc welding with a consumable electrode, a welding wire functions as a discharge electrode, and an arc is generated from the distal electrode end of the welding wire to weld a welded article (base material). The arc consumes the welding wire. Thus, welding is performed by feeding the welding wire in accordance with the consumption of the welding wire. Japanese Patent No. 4807474 describes an example of a welding method that cyclically changes the feeding speed of the welding wire. The feeding speed includes a forward feeding speed and a rearward feeding speed.

There is always a desire to improve the welding quality of the welded article. The inventors of the present invention have conducted studies to reduce blow holes or the like in order to further improve the welding quality of the welded article.

SUMMARY OF THE INVENTION

One aspect of the present invention is an arc welding power supply that supplies power to a welding wire functioning as a discharge electrode to generate an arc from an electrode distal end of the welding wire and perform arc welding on a welded article. The arc welding power supply includes an output control unit that adjusts the power supplied to the welding wire to a power value suitable for arc welding. A feed control unit cyclically changes a feeding speed of the welding wire. The feeding speed includes a forward feeding speed and a rearward feeding speed. An amplitude control unit cyclically changes an amplitude of the feeding speed of the welding wire to cyclically vary an average arc length.

Another aspect of the present invention is an arc welder including the arc welding power supply of the above aspect. A welding torch holds the welding wire, receives power from the arc welding power supply, and supplies the received power to the welding wire. A feeder feeds the welding wire to the welding torch. The arc welding power supply controls the feeding of the welding wire with the feeder.

A further aspect of the present invention is a method for controlling an arc welding power supply that supplies power to a welding wire functioning as a discharge electrode to generate an arc from an electrode distal end of the welding wire and perform arc welding on a welded article.

The method includes adjusting the power supplied to the welding wire to a power value suitable for arc welding and cyclically changing a feeding speed of the welding wire. The feeding speed includes a forward feeding speed and a rearward feeding speed. The method further includes cyclically changing an amplitude of the feeding speed of the welding wire to cyclically vary an average arc length.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of an arc welding power supply and a method for controlling an arc welding power supply will now be described.

Figure 1:
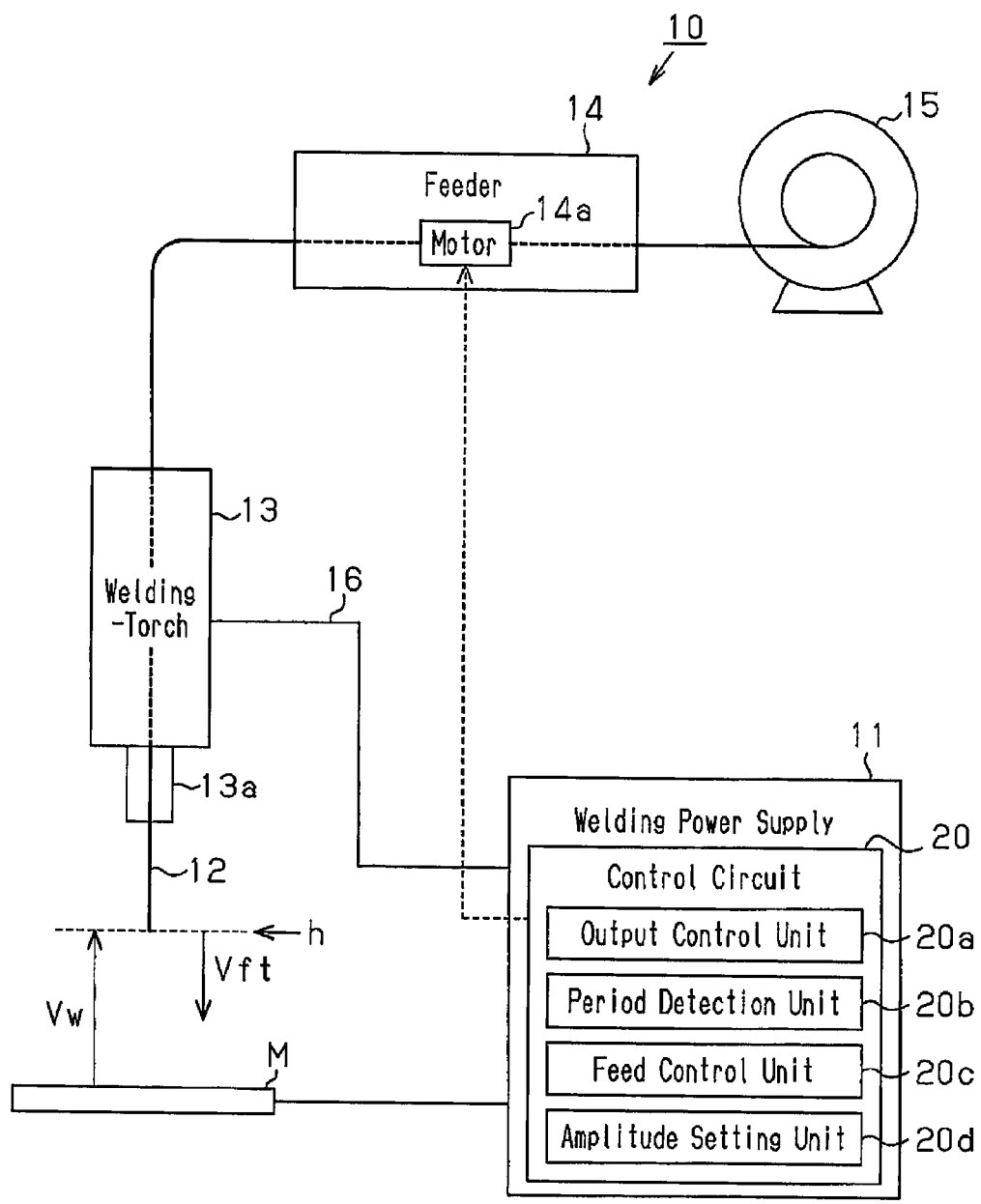
FIG. 1 is a schematic diagram showing one embodiment of an arc welder (arc welding power supply.

As shown in FIG. 1, an arc welder 10 includes an arc welding power supply 11, a welding wire 12, a welding torch 13, a feeder 14, and a wire stand 15. The arc welding power supply 11 generates output power suitable for arc welding. The welding wire 12 functions as a discharge electrode that generates an arc. The welding torch 13 holds the welding wire 12 and supplies power to the welding wire 12. The feeder 14 feeds the welding wire 12 to the welding torch 13. The welding wire 12 is wound around the wire stand 15.

The welding torch 13 is connected to the power supply 11 by a power cable 16. The power supply 11 supplies the welding torch 13 with power through the power cable 16. The welding torch 13 includes a power supplying tip 13a that supplies power to the welding wire 12. The power supplying tip 13a is in electric contact with the welding wire 12 to supply power from the power supply 11 to the welding wire 12, while allowing the welding wire 12 to be fed from the feeder 14. When welding a welded article (base material) M, the welding torch 13 is arranged so that the power supplying tip 13a is directed toward the welded article (base material) M.

The feeder 14 includes a motor 14a, which functions as a drive source. The feeder 14 drives the motor 14a to draw out the welding wire 12 from the wire stand 15 and feed the welding wire 12 to the welding torch 13. The generation of arcs consumes the welding wire 12, which functions as a discharge electrode. Thus, the feeder 14 feeds the welding wire 12 to the welding torch 13 to compensate for the consumption of the welding wire 12. When feeding the welding wire 12, the welding wire 12 is fed forward (advanced) or fed rearward (reversed). Further, the feeding speed Vft of the welding wire 12 is changed. The power supply 11 includes a control circuit 20 that controls the feeder 14 (motor 14a). The control circuit 20 controls the switching of the welding wire 12 between the forward and rearward feeding direction. The control circuit 20 also controls the feeding speed of the welding wire 12, that is, the rotation speed produced by the motor 14a.

The control circuit 20 includes a CPU. The control circuit 20 includes an output control unit 20a, which controls the generation of an output voltage used for arc welding, a period detection unit 20b, which detects a short-circuiting period Ts and an arc period Ta, a feed control unit 20c, which controls the feeding of the welding wire 12, and an amplitude setting unit 20d, which sets the amplitude of the feeding speed of the welding wire 12 that cyclically changes. With such a configuration, the control circuit 20 executes a control for performing arc welding in a suitable manner.

Figure 2:
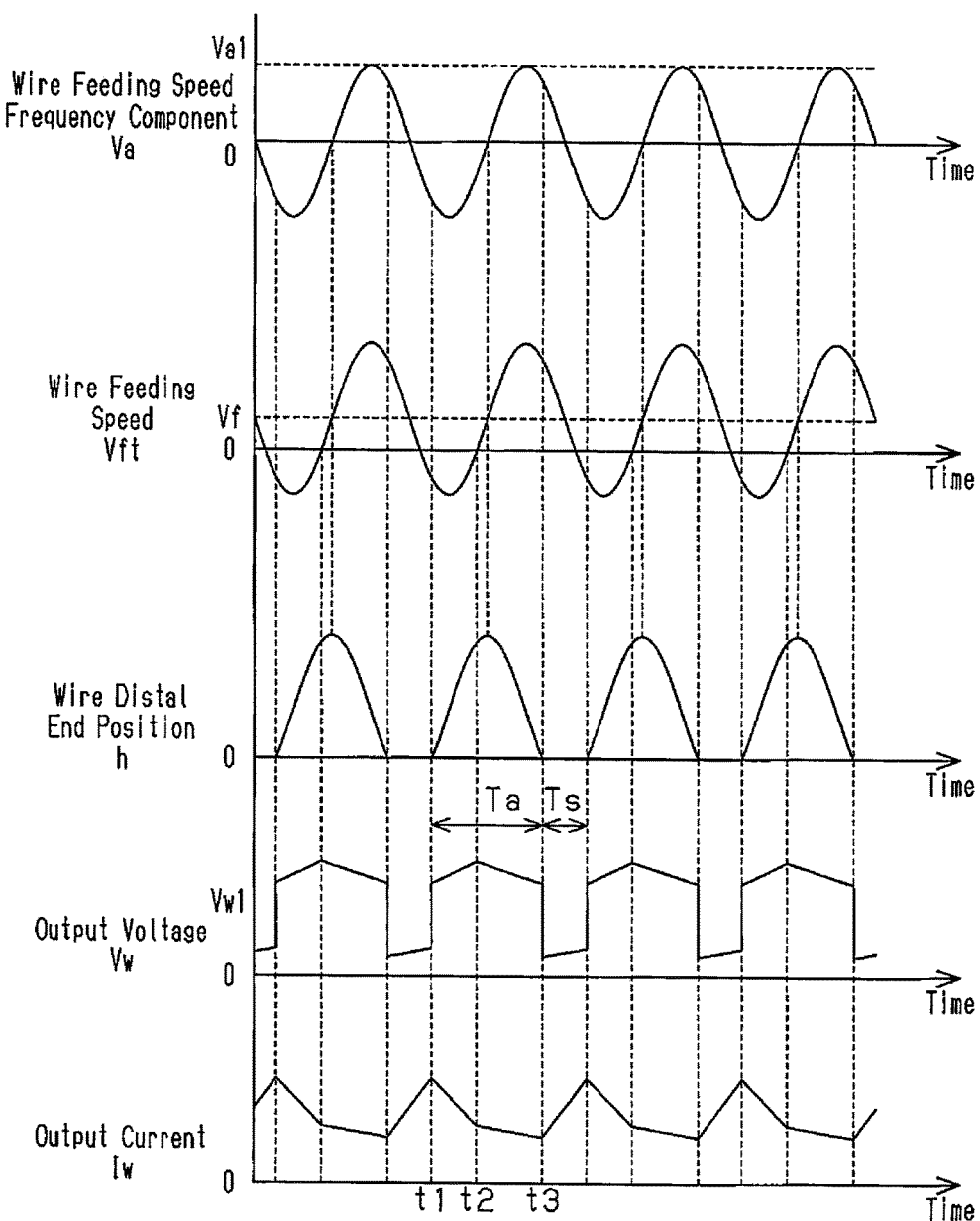
FIG. 2 is a waveform chart illustrating the control executed in a normal welding mode.

Referring to FIG. 2, when the consumable electrode type arc welder 10 welds the welded article (base material) M, a short-circuiting period Ts, during which the welding wire 12 contacts the welding article M, and an arc period Ta, during which the welding wire 12 is separated from the welded article M to generate an arc, are alternately repeated. In the control circuit 20, the output control unit 20*a* adjusts the output voltage, that is, at least one of the output voltage (arc voltage) Vw and the output current (arc current) Iw. Further, the feed control unit 20*c* adjusts the feeding direction and the feeding speed Vft of the welding wire 12. This produces the short-circuiting period Ts and the arc period Ta in a suitable manner.

The feeding speed Vft of the welding wire 12 is set by superimposing a frequency component Va, such as a sine wave, trapezoidal wave, or a triangular wave, on a positive constant speed Vf, which takes into consideration the consumed amount of the welding wire 12. When the feeding speed Vft is in a positive range and greater than zero, the welding wire 12 is fed forward to advance the welding wire 12. When the feeding speed Vft is in a negative range and less than zero, the welding wire 12 is fed rearward to reverse the welding wire 12.

At time t1, reverse feeding of the welding wire 12 is started, and the distal end position h of the welding wire 12 relative to the welded article M is zero. The distal end position h of the welding wire 12 indicates the distance from the welded article M. When the distal end position H is located at the zero position, the distal end of the welding wire 12 is in contact with the welded article M. Then, the distal end position h of the welding wire 12 is gradually increased from zero. More specifically, at time t1, the welding wire 12 starts to move away from the welded article M. This starts an arc period Ta. At time t2, the feeding of the welding wire 12 is switched from reverse feeding to forward feeding, and the distal end position h of the welding wire 12 is close to the maximum position. At the time when the feeding speed Vft of the welding wire 12 becomes speed Vf (frequency component Va is zero), the distal end position h of the welding wire 12 becomes the maximum position. That is, the welding wire 12 is most separated from the welded article M. Subsequently, the distal end position h of the welding wire 12 gradually decreases, and the welding wire 12 moves toward the welded article M. At time t3 that is slightly past the peak of the forward feeding speed of the welding wire 12, the distal end position h of the welding wire 12 is returned to the zero position where the welding wire 12 contacts the welded article M again. This ends the arc period Ta and starts a short-circuiting period Ts. Such processes are repeated when the arc welder 10 is in operation.

Figure 3:
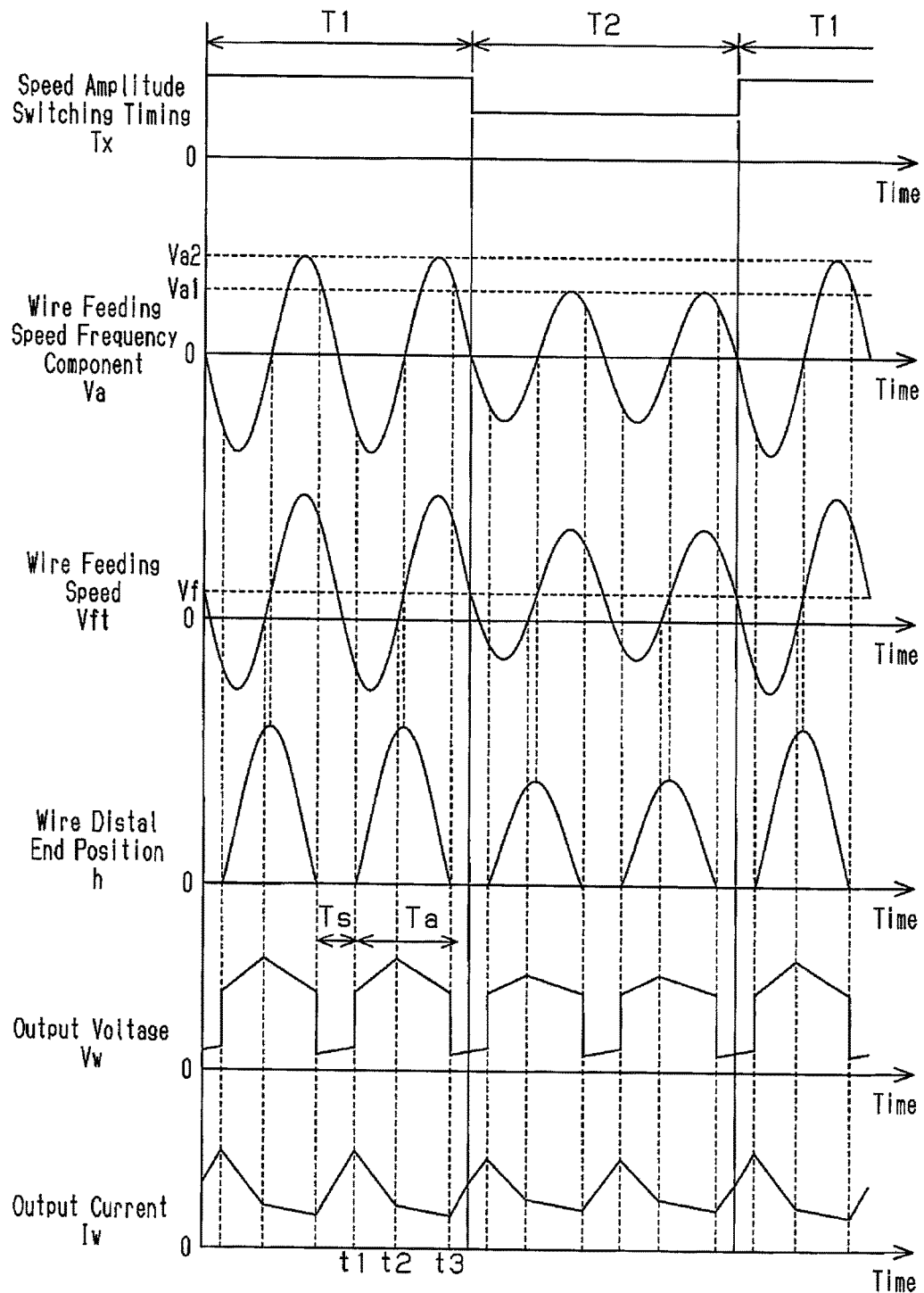
FIG. 3 is a waveform chart illustrating the control executed in an agitation welding mode.

To improve the welding quality by improving the bead quality, the reduction of blow holes is effective. An effective means for reducing blow holes is increasing the agitation of a molten weld pool (molten material) of the welded article M when welding the welded article M. The control circuit 20 of the present embodiment is configured to be able to selectively perform a normal welding mode (refer to FIG. 2) and an agitation welding mode (refer to FIG. 3).

The power supply 11 includes a setting device (not shown) that sets the welding mode and parameters, such as the output voltage Vw and the output current Iw. A welder operator operates the setting device to set the welding mode and set the parameters such as the output voltage Vw and the output current Iw in accordance with the material of the welded article M and the shape of the welded portion. The output control unit 20*a* executes output control based on the set values. Further, the output control unit 20*a* executes feed control based on the set values. With regard to the feed control, in the normal welding mode, the amplitude setting unit 20*d* sets the amplitude of the feeding speed Vft (amplitude of frequency component Va) of the welding wire 12 based on the set output voltage Vw and the like. In the agitation welding mode, the amplitude setting unit 20*d* sets two different values for the amplitude of the feeding speed Vft (amplitude of frequency component Va) of the welding wire 12 and a speed amplitude switching timing Tx for switching the two values. In the present specification, the amplitude setting includes at least one of setting the difference of the maximum peak value (second amplitude value Va2 shown in FIG. 3) and the minimum peak value (first amplitude value Va1 shown in FIG. 3) in the frequency component Va of the feeding speed Vft of the welding wire 12 and setting the positive and negative waveform shape (shape of trapezoid for trapezoidal wave) of the frequency component Va of the feeding speed Vft of the welding wire 12 while keeping the difference of the maximum and minimum peak values constant.

Normal Welding Mode

Based on the set voltage of the output voltage Vw or the like, the amplitude setting unit 20*d* sets the amplitude of the frequency component Va of the feeding speed Vft of the welding wire 12 to, for example, the first amplitude value Va1 shown in FIG. 2. The feed control unit 20*c* controls the feed of the welding wire 12 based on the amplitude of the set feeding speed Vft. In the normal welding mode, the amplitude value of the feeding speed Vft of the welding wire 12 is fixed and not changed during welding.

Agitation Welding Mode

Based on the set voltage of the output voltage Vw or the like, the amplitude setting unit 20*d* sets the amplitude of the frequency component Va of the feeding speed Vft of the welding wire 12 to two different values, for example, the first amplitude value Va1 and the second amplitude value Va2, which is larger than the first amplitude value Va1. Further, the amplitude setting unit 20*d* sets the switching timing Tx for switching the first and second amplitude values Va1 and Va2. The speed amplitude switching timing Tx is set to produce a period T2 that uses the first amplitude value Va1 and a period T1 that sets the second amplitude value Va2. For example, in the present embodiment, periods T1 and T2 have the same length. The speed amplitude switching timing Tx is set at a timing at which the frequency component Va becomes zero.

In this manner, the amplitude of the feeding speed Vft of the welding wire 12 is cyclically changed to cyclically vary the average arc length, change the arc force, and increase the vibration of the molten pool (molten material). This enhances the agitation of the molten pool, reduces blow holes, and improves the bead quality. Further, by setting the cyclic change of the amplitude of the feeding speed Vft of the welding wire 12 taking into consideration resonance of the vibration of the molten pool (molten material), the agitation action of the molten pool may be generated in a further suitable manner.

Unlike the present embodiment, when performing welding that cyclically changes the feeding speed including the forward feeding speed and the rearward feeding speed, electrical parameters such as the current value and the cycle of current pulses may be changed to vibrate the molten pool. However, the control performed in the present embodiment to cyclically change the amplitude of the feeding speed Vft of the welding wire 12 acts to directly vibrate (agitate) the molten pool. Thus, the present embodiment allows for the agitation action of the molten pool to be performed in a further suitable manner.

The advantages of the present embodiment will now be described.

(1) The amplitude of the feeding speed Vft (amplitude of frequency component Va) of the welding wire 12 is cyclically changed to cyclically vary the average arc length. Thus, the arc force changes in the same manner, vibration of the molten pool (molten material) of the welded article M increases, and agitation of the molten pool is enhanced. This improves the welding quality by, for example, reducing blow holes and improving the bead quality.

(2) The amplitude of the feeding speed Vft of the welding wire 12 is changed so that period T1, which sets the frequency component Va to the first amplitude Va1, and period T2, which sets the amplitude of the frequency component Va to the second amplitude value Va2, have the same length and are alternately produced. Such a control may be easily performed. This reduces the load on the control circuit 20 (CPU).

It should be apparent to those skilled in the art that the present invention may be embodied in many other specific forms without departing from the spirit or scope of the invention. Particularly, it should be understood that the present invention may be embodied in the following forms.

In the agitation welding mode, the first amplitude value Va1 is the same as the normal amplitude value Va1 (same reference character). Instead, for example, the normal amplitude Va1 may be the same as the second amplitude value Va2, and the first amplitude value Va1 under this situation may be smaller than the normal amplitude value Va1. Further, the normal amplitude value Va1 may be set to be the median value between the first and second amplitude values Va1 and Va2. Further, two different speed amplitude values (first and second amplitude values Va1 and Va2) are used. However, three or more amplitude values may be used. In this case, the amplitude values may be sequentially changed in accordance with the present situation.

In the agitation welding mode, the speed amplitude switching timing Tx is set so that the two periods T1 and T2 have the same length. The two periods T1 and T2 may first have different lengths, and the lengths of the periods T1 and T2 may be sequentially changed in accordance with the present situation.

The speed amplitude values, such as the first and second amplitude values Va1 and Va2, and the switching timing Tx, which switches the speed amplitude value, are changed based on the set output voltage Vw or the like. However, the speed amplitude values and the switching timing Tx may be set based on a different value.

The present examples and embodiments are to be considered as illustrative and not restrictive, and the invention is not to be limited to the details given herein, but may be modified within the scope and equivalence of the appended claims.

The invention claimed is:

1. An arc welding power supply that supplies power to a welding wire functioning as a discharge electrode while alternately performing forward feeding and reverse feeding of the welding wire to generate an arc from an electrode distal end of the welding wire and perform arc welding on a welded article, the arc welding power supply comprising a control circuit that is configured to:
    adjust the power supplied to the welding wire to a power value suitable for arc welding;
    cyclically change a feeding speed of the welding wire, wherein the feeding speed includes a forward feeding speed and a rearward feeding speed;
    set a plurality of amplitude values of the feeding speed of the welding wire based on a set voltage of an output voltage; and
    cyclically switch an amplitude of the feeding speed of the welding wire between the plurality of amplitude values to cyclically vary an average arc length.

2. The arc welding power supply according to claim 1, wherein the feeding speed of the welding wire includes a frequency component;
    an amplitude of the frequency component of the feeding speed of the welding wire includes a first amplitude value and a second amplitude value, which differs from the first amplitude value; and
    the control circuitry is configured to change the amplitude of the feeding speed of the welding wire so that a first period, in which the amplitude of the frequency component of the feeding speed of the welding wire is set to the first amplitude value, and a second period, in which the amplitude of the frequency component of the feeding speed of the welding wire is set to the second amplitude value, are alternately produced.

3. An arc welder comprising: the arc welding power supply according to claim 1;
    a welding torch that holds the welding wire, receives power from the arc welding power supply, and supplies the received power to the welding wire; and
    a feeder that feeds the welding wire to the welding torch, wherein the arc welding power supply controls the feeding of the welding wire with the feeder.

* * * * *